United States Patent
Gosti (10) Patent No.: US 8,386,987 B1
(45) Date of Patent: Feb. 26, 2013

(54) METHOD AND SYSTEM FOR IMPLEMENTING AND ANALYZING POWER SWITCH CONFIGURATIONS

(75) Inventor: Wilsin Gosti, Fremont, CA (US)

(73) Assignee: Cadence Design Systems, Inc., San Jose, CA (US)

(*) Notice: Subject to any disclaimer, the term of this patent is extended or adjusted under 35 U.S.C. 154(b) by 274 days.

(21) Appl. No.: 12/414,377

(22) Filed: Mar. 30, 2009

Related U.S. Application Data (60) Provisional application No. 61/040,864, filed on Mar. 31, 2008.

(51) Int. Cl.
*G06F 9/455* (2006.01)
*G06F 17/50* (2006.01)

(52) U.S. Cl. ......... 716/133; 716/110; 716/120; 716/132

(58) Field of Classification Search .................... 716/133
See application file for complete search history.

(56) References Cited

U.S. PATENT DOCUMENTS

| 2005/0138588 | A1* | 6/2005 | Frenkil ............................. 716/6 |
| 2006/0093129 | A1* | 5/2006 | Redorta et al. ................ 379/413 |
| 2006/0265681 | A1* | 11/2006 | Bakir et al. ..................... 716/10 |

OTHER PUBLICATIONS

Mutoh, et al. Aug. 1995. "1-V Power Supply High-Speed Digital Circuit Technology with Multithreshold Voltage CMOS." Solid-State Circuits. pp. 847-854.
Long, et al. Sep. 2004. "Distributed Sleep Transistor Network for Power Reduction." IEEE VLSI Systems. pp. 937-946.
Novwak. 2002. "Maintaining the Benefits of CMOS Scaling When Scaling Bogs Down." IBM J. Res & Dev. pp. 169-180.
International Technology Roadmap for Semiconductors 2002 Edition. 2002. Semiconductor Industry Association.
Burr, et al. Sep. 1999. "Energy Considerations in Multichip-Module-Based Multiprocessors." Proc. International Conference on Computer Design. pp. 593-600.
Halter, et al. 1997. "A Gate-Level Leakage Power Reduction Method for Ultra Low-Power CMOS Circuits." Proc. IEEE Custom Integrated Circuits Conf. pp. 475-478.
Jiang, et al. Oct. 2005. "Benefits and Costs of Power-Gating Technique." Proc. Int Conference on Computer Design. pp. 559-566.
Kao, et al. Nov. 2002. "Subthreshold Leakage Modeling and Reduction Techniques." Proc. Int. Conference. Computer-Aided Design. pp. 141-148.
SOC Encounter 6.1 Command Reference. Nov. 2006.

* cited by examiner

*Primary Examiner* — Vuthe Siek
*Assistant Examiner* — Eric Lee
(74) *Attorney, Agent, or Firm* — Vista IP Law Group, LLP (57) ABSTRACT

Disclosed is an improved method and system for implementing and analyzing power switch configurations. Described is a novel approach to minimize the number of power switches required for a power domain and to automatically find the locations of those power switches subject to the constraints of saturation current and maximum IR-drop on the power switches. This approach uses a fast static power consumption analysis tool to compute the current and IR drop through the power switches. The approach can apply to both column and ring style power switch insertion methodologies.

36 Claims, 10 Drawing Sheets

METHOD AND SYSTEM FOR IMPLEMENTING AND ANALYZING POWER SWITCH CONFIGURATIONS

CROSS-REFERENCE TO RELATED APPLICATIONS

The present application claims the benefit of U.S. Provisional Application Ser. No. 61/040,864, filed on Mar. 31, 2008, which is hereby incorporated by reference in its entirety.

FIELD

The invention relates to the design and manufacture of integrated circuits, and more particularly, to systems and methods for implementing and analyzing power switch configurations for an electronic design.

BACKGROUND

The invention relates to the design and manufacture of integrated circuits. An integrated circuit (IC) has a large number of electronic components, such as transistors, logic gates, diodes, and wires, which are fabricated by forming layers of different materials and of different geometric shapes on various regions of a silicon wafer.

Many phases of an electronic design may be implemented with computer aided design (CAD) tools or electronic design automation (EDA) systems. To design an integrated circuit, a designer first creates high level behavior descriptions of the IC device using a high-level hardware design language. An EDA system typically receives the high level behavior descriptions of the IC device and translates this high-level design language into netlists of various levels of abstraction using a computer synthesis process. A netlist describes interconnections of nodes and components on the chip and includes information of circuit primitives such as transistors and diodes, their sizes and interconnections, for example. The netlist may then be implemented as a physical design based upon the processes of layout, placement, and routing. The circuit design may be verified, analyzed, and/or optimized at numerous stages within the design process.

As more and more functionalities are integrated into an IC chip, controlling the power consumption of the chip has become a major design challenge. Increasingly, designs incorporate power management circuitry that uses power switches to turn off blocks of the designs when they are not needed.

One approach to implementing power switch configurations is to use simple manual calculations to determine the number of needed power switches during floorplanning. The problem with this approach is that such calculations are very simplistic and may be severely inaccurate. As a result, designers that use this approach may need to be overly conservative with power switch configuration, resulting in more power switches than are actually required for the design. The extra power switches contribute to the leakage power consumption for the blocks that they are used to turn off. This constitutes a large proportion of the power consumption when the blocks are turned off, e.g. when the chip is in stand-by mode.

Therefore, there is a need for an improved approach to performing power switch analysis and optimization.

SUMMARY

Embodiments of the invention provide an improved method and system for implementing and analyzing power switch configurations. According to some embodiment, described is a novel approach to minimize the number of power switches required for a power domain and to automatically find the locations of those power switches subject to the constraints of saturation current and maximum IR-drop on the power switches. This embodiment uses a fast static power consumption analysis tool to compute the current and IR drop through the power switches. The approach can apply to both column and ring style power switch insertion methodologies.

Further details of aspects, objects, and advantages of the invention are described below in the detailed description, drawings, and claims. Both the foregoing general description and the following detailed description are exemplary and explanatory, and are not intended to be limiting as to the scope of the invention.

DETAILED DESCRIPTION

Disclosed is an improved method and system for implementing and analyzing power switch configurations. A novel approach is described that minimizes the number of power switches to adequately support blocks of a design such that the saturation current and IR-drop requirements are met. The approach separates the physical implementation from the optimization. This allows it to be applied at other stages of the design flow as well.

Figure 1A:
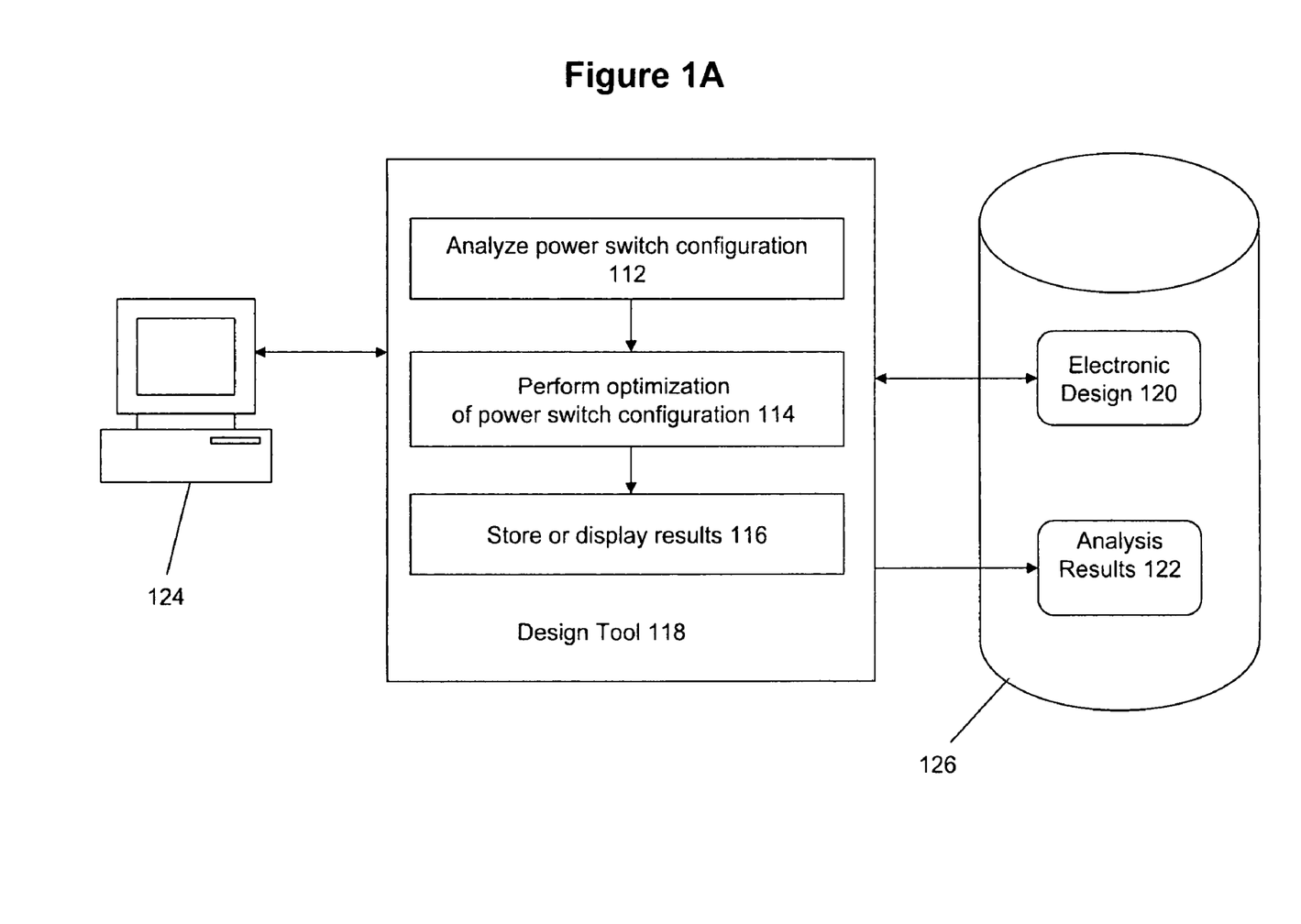
FIG. 1A illustrates a high level architectural diagram of an example system with which the invention may be implemented.

FIG. 1A illustrates a high level architectural diagram of an example system with which the invention may be implemented. A user at a user station 124 utilizes an electronic design tool, e.g., a physical design tool 118, to analyze, implement, and/or optimize the power switch configuration/design of an electronic design 120. The electronic design 120 is stored in an electronic design database 126.

The power analysis tool 118 receives the electronic design 120 to analyze the power switch configuration 112. Any suitable analysis approach may be used in the invention, including without limitation, either or both static power analysis tool or dynamic power analysis. For the purposes of illustration only, and not for purposes of limitation, the embodiments below will be described with respect to static power analysis.

Based upon the results of the power analysis, optimization of the power switch configuration is performed 114. The analysis results 122 and an optimized design may also be stored in the database, or displayed to the user at the user station 116.

In general, some embodiments of the invention utilize several process stages to analyze and optimize a power switch configuration. One process stage is constraint mapping. A novel approach is used to map multiple constraints: IR-drop constraints on cells in the design, IR-drop constraints on power switches, and maximum saturation currents on power switches, into a single maximum current on power switches. Alternative embodiments can map other constraints in addition to the constraints the invention is already handling.

Power consumption analysis is also performed. Computation is performed of the power consumption of each cell in the design. Alternative embodiments can use different power consumption algorithms.

In addition, processing is performed for IR-drop analysis. Fast I-R analysis is performed to compute the IR-drop of each cell in the design. The IR-drop analysis is tightly integrated with the optimization approach. Alternative embodiments can use different power consumption algorithms or stand-alone algorithms.

An initial solution can be generated for the processing. After an initial power and IR-drop analysis, the approach estimates the number of power switches needed everywhere along the locations where power switches are inserted. This estimation drives the optimization process to find the initial solution fast. Alternative embodiments can use different estimation algorithms.

An iterative refinement process is performed in some embodiments. The invention iteratively adds and deletes power switches to reduce the number of power switches needed. It uses a fast computation to estimate the impact the adding and deleting switches before they are actually added or deleted. Alternative embodiments can use different estimation algorithms to predict the impact of adding or deleting switches before they are actually added or deleted. Alternative embodiments can also simply add and delete switches without any estimation and compute the impact afterwards.

Figure 1B:
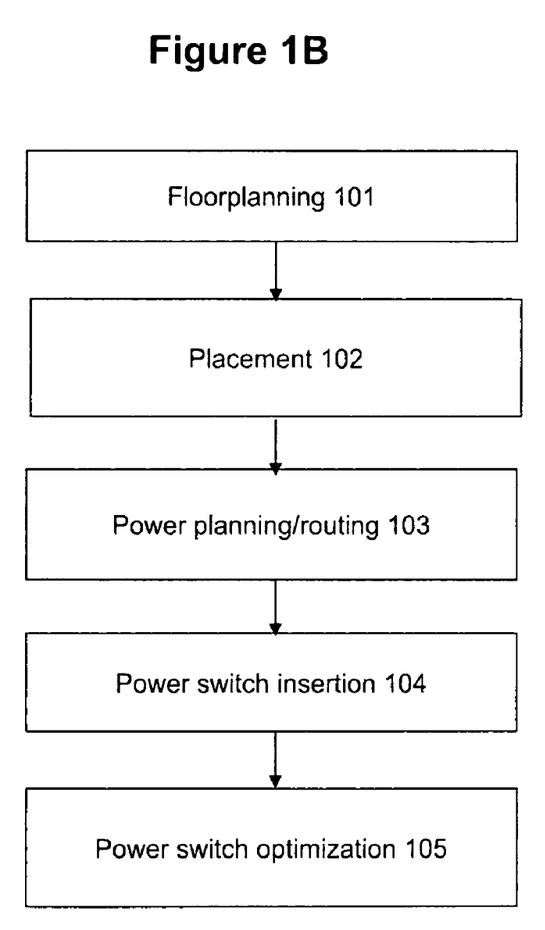
FIG. 1B shows how the invention can be used in an example prototyping flow.

FIG. 1B shows how the invention can be used in an example prototyping flow. The power switch optimization of the present invention at 105 is shown to follow floorplanning at 101. Floorplanning 101 is employed to analyze and generate a floorplan for the electronic design. Placement is performed at 102 to perform placement of components on the design floorplan. Power planning or power routing is performed at 103 to perform planning or routing of components for the design. At 104, power switch insertion is performed to insert power switches into the design. Users can check to see if constraints are met and iterate with a new power plan or with a new floorplan.

Figure 2:
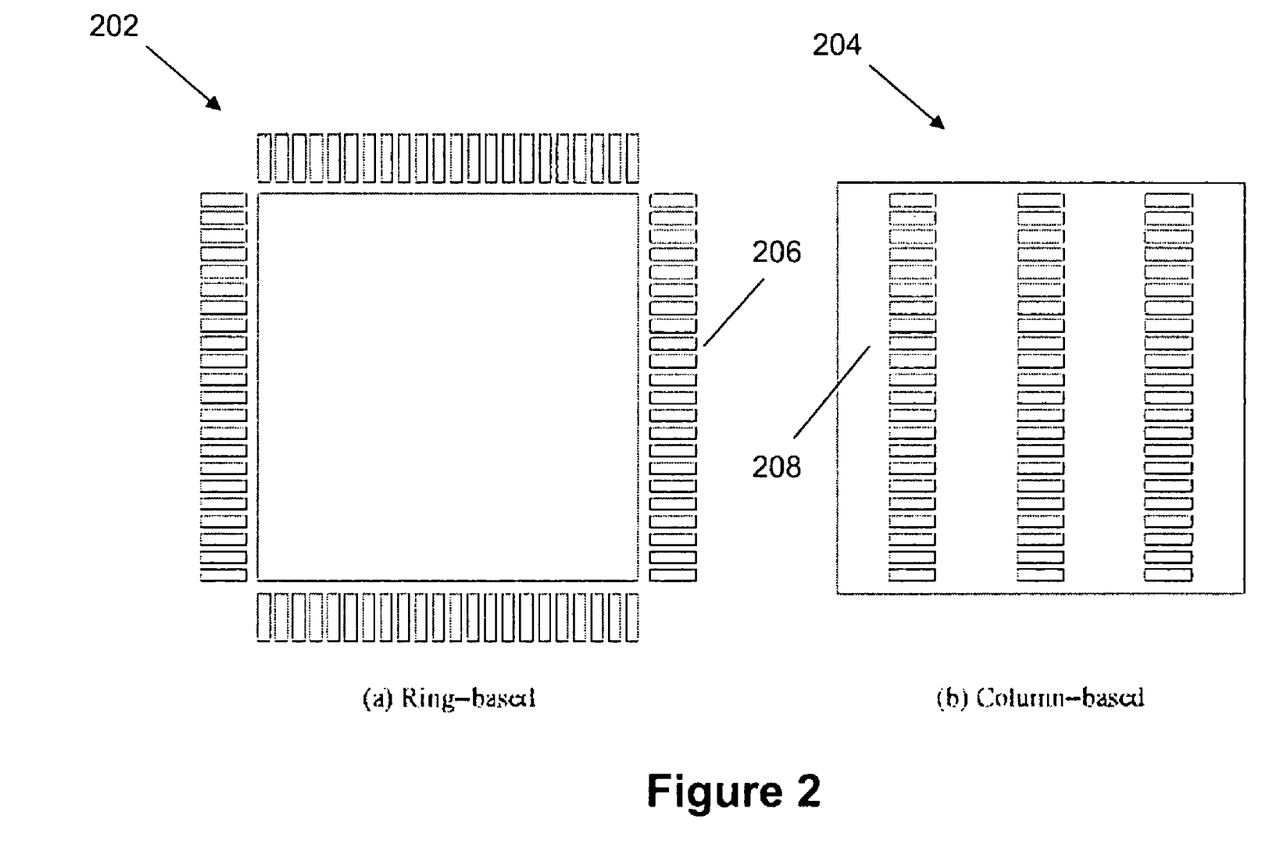
FIG. 2 illustrates different power switch methodologies.

Any power switch methodology can be addressed using the present invention. For example, both the ring-based 202 and column-based 204 methodologies are different power switch methodologies supported by embodiments of the invention. These configurations are illustrated in FIG. 2.

In ring-based methodology 202, power switches 206 are inserted around the block to be turned on and off. In column-based methodology 204, power switches 208 are inserted at equally spaced columns inside the block to be turned on and off. There are several variations of these methodologies. For example, checker-board pattern can be used for the column-based methodology, and custom patterns can be defined for the ring-based methodology. For clarity purposes, the explanation of the below embodiments will focus only on ring-based methodology. However, it is noted that the invention is applicable to other methodologies as well, including application to the column based methodology.

Figure 3:
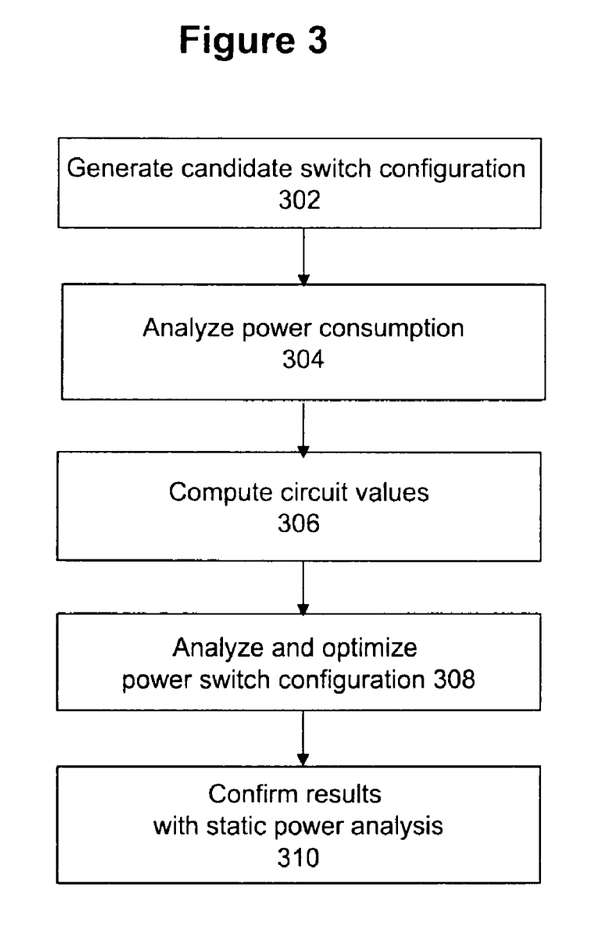
FIG. 3 shows a flowchart of a process for implementing, analyzing, and optimizing a power switch configuration according to some embodiments of the invention.

FIG. 3 shows a flowchart of a process for implementing, analyzing, and optimizing a power switch configuration according to some embodiments of the invention. An electronic design is created that has an initial candidate power switch configuration at 302. According to one embodiment, the initial configuration is expected to be conservative with respect to the number of power switches, such that there is likely to be more switches than are actually needed to handle the expected power consumption for the design. With this approach, the subsequent analysis and optimization actions (discussed below) will remove any excess power switches that might have been placed into the initial candidate switch configuration. Alternatively, the initial configuration can be set to be overly optimistic with respect to the number of power switches, such that there may be too few power switches to handle the power consumption requirements of the circuit design. For this approach, the subsequent analysis and optimization actions will likely add more power switches to the design.

Next, the present embodiment of the invention uses a fast static power consumption analysis tool to compute the current and IR-drop through power switches and cells in the design. The analysis is a two-step process according to some embodiments. At 304, the process computes the power consumed by each instance assuming that there is no IR-drop at the power pins. This can be performed by any suitable power analysis tool.

Figure 4:
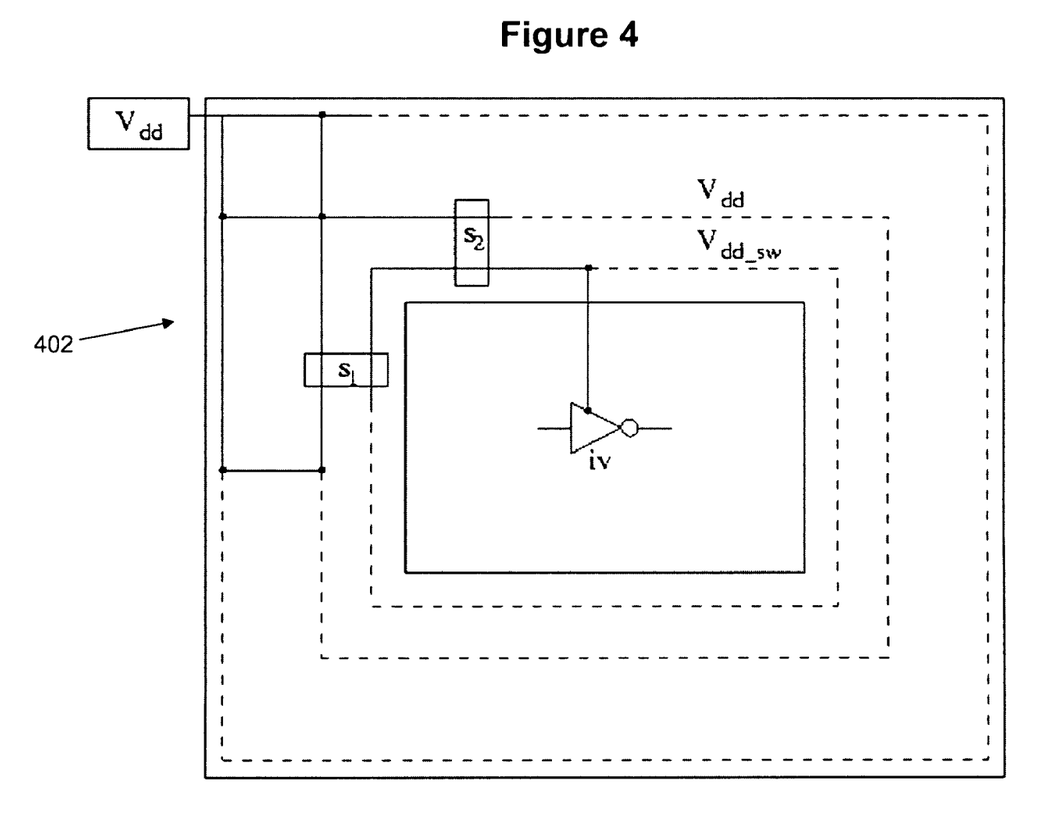
FIG. 4 shows an example circuit.
Figure 5:
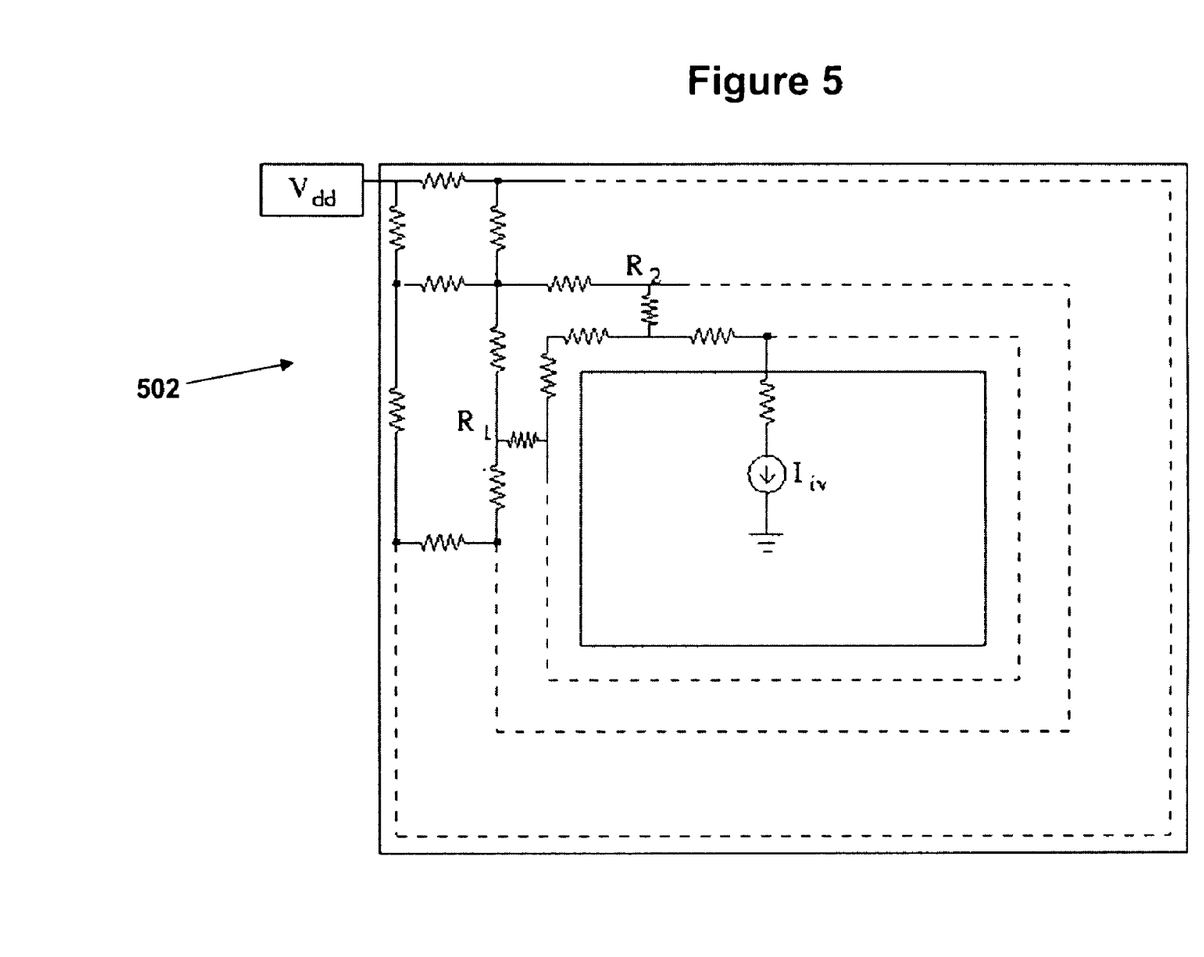
FIG. 5 shows an example electrical model for the circuit of FIG. 4.

At 306, the process uses the computed power consumed by each instance to compute the current through power switches and IR drops of cells. Each wire segment is modeled by a resistor. Each cell instance is modeled by a current source computed by dividing the instance power computed in the first step by the supply voltage. The power switches are modeled by their ON-resistances. For the example circuit 402 shown in FIG. 4, its electrical model 502 used in the static power analysis is shown in FIG. 5. The conductance matrix equation of the circuit is constructed and the node voltages are solved.

Referring back to FIG. 3, the next action is to analyze and optimize the power switch configuration of the electrical design at 308. This action will be described in more detail below, with respect to FIG. 6. Finally, the optimization results can be confirmed using a power analysis tool, e.g., by performing static power analysis upon the optimized circuit design 310.

This document will now describe the specific details of an approach for implementing, analyzing, and optimizing a power switch configuration according to an embodiment of the invention. According to one type of design practice for implementing a power switch methodology, an IR-drop budget is decided a priori. There is a maximum IR-drop budget from the pad to the power switches, there is a maximum IR-drop budget across the power switches, and there is a maximum IR-drop budget inside the block or power domain controlled by the power switches.

The problem formulation for the present embodiment follows this practice. Assume that the set of inserted power switches is represented by $S=\{s_1, s_2, \ldots, s_n\}$, the current and voltage drop across power switch $s_i$ are $I(s_i)$ and $IR(s_i)$ respectively (where $s_i$ is one of the elements within the set S), the given saturation current is $Isat(s_i)$, and the given maximum IR-drop across $s_i$ is $IR_{max}(s_i)$. Further assume that the set of cells to be turned off by S is $C=\{c1, c2, \ldots, cm\}$, the current and voltage across cell $c_i$ are $I(c_i)$ and $V(c_i)$, respectively. The supply voltage is $V_{dd}$, and the minimum voltage constraint at the supply pin of cell $c_i$ is $V_{min}(c_i)$. The constraint $V_{min}(c_i)$ is used to describe the maximum IR-drop for a cell $c_i$ in C, which is equal to $(V_{dd}-V_{min}(c_i))$.

The invention addresses the problem of minimizing the number of power switches in or around a block while satisfying the saturation current and IR-drop requirements, i.e.

$$\forall s_i I(s_i) \leq \bar{I}_{sat}(s_i), \forall s_i IR(s_i) \leq IR_{max}(s_i), \text{ and } \forall c_i V(c_i) \geq V_{mins}(c_i).$$

The coordinates of $s_i$ flare represented as $(s_i.x, s_i.y)$ and that of $c_i$ as $(c_i.x, c_i.y)$.

The coordinate of $s_i$ is represented as $(s_i.x, s_i.y)$ and that of $c_i$ as $(c_i.x, c_i.y)$.

Figure 6:
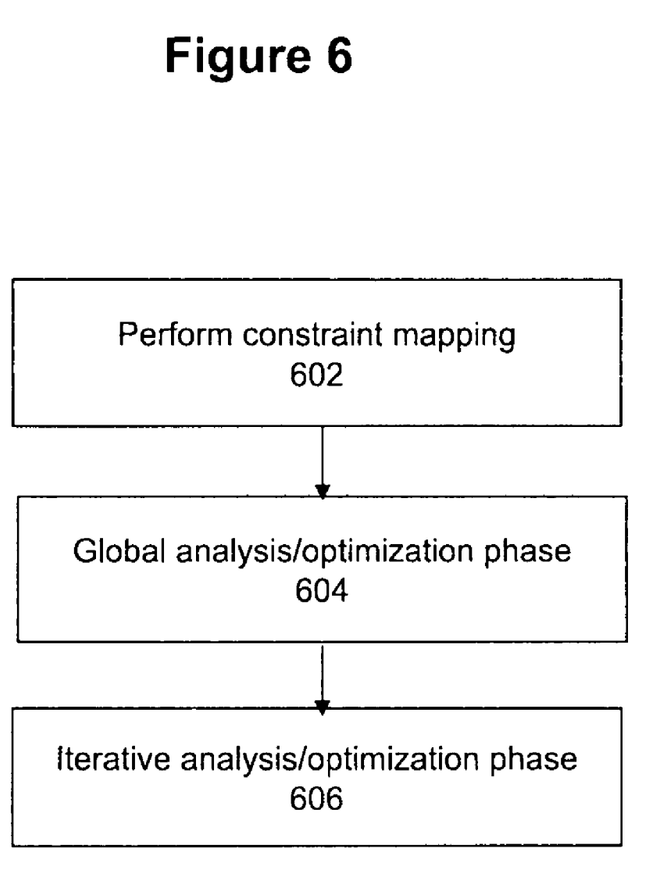
FIG. 6 shows a flowchart of a process to analyze and optimize a circuit design for its power switch configuration according to an embodiment of the invention.

FIG. 6 shows a flowchart of a process to analyze and optimize a circuit design for its power switch configuration according to an embodiment of the invention. Before optimization, the process first performs the action of constraint mapping 602. In this action, the process converts saturation current $I_{sat}(si)$ and maximum IR-drop $IR_{max}(s_i)$ across power switch $s_i$ and minimum voltage $V_{min}(c_i)$ at cell $c_i$ into a maximum current constraint $I_{max}(s_i)$ across each power switch $s_i$. This conversion is accomplished using the following equation:

$$I_{max}(s_i) = \min\left\{I_{sat}(s_i), \frac{IR_{max}(s_i)}{R_{on}(s_i)}, I_e(s_i)\right\},$$

where $R_{on}(s_i)$ is the on-resistance of $s_i$ and $I_c(s_i)$ is the maximum current across power switch $s_i$ as a result of the mapping $V_{min}(c_i)$ into a current constraint at each power switch.

Figure 7:
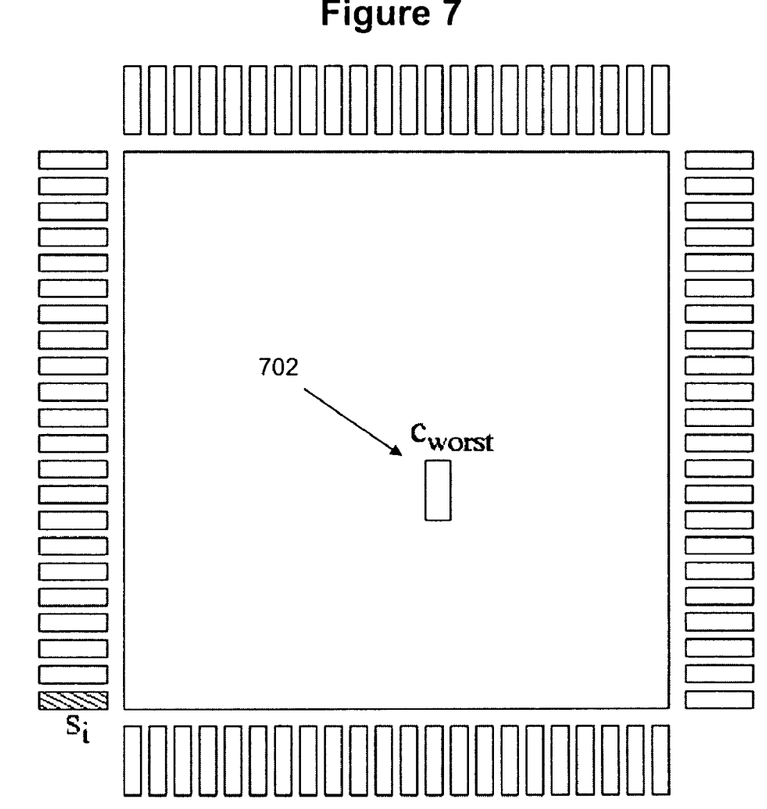
FIG. 7 illustrates a cell with a worst IR-drop.

The voltage slack $V_s(c_i)$ of cell $c_i$ is defined as the difference between its current voltage and its minimum required voltage, i.e. $V_s(c_i)=V(c_i)-V_{min}(c_i)$. The voltage slack of a power switch is defined similarly. The cell with the worst IR-drop is referred to as $c_{worst}$ 702 as shown in FIG. 7. This can be determined, for example, by performing static power analysis upon the circuit design. For each switch $s_i$, $I_c(s_i)=I(s_i)+V_s(c_{worst})/R_{on}(s_i)$. The rationale behind this mapping in the present embodiment is that the total current required by all the cells C is approximately constant. Any extra IR-drop on a cell in C translates into approximately the same IR drop on the power switches.

The advantage of the constraint mapping action is that it allows the optimization to be implemented while needing only a single maximum current constraint. The process performs a new mapping before the optimization step in each iteration. This approximation will likely become more accurate through each succeeding iteration.

Returning back to FIG. 6, the process comprises an additional two phases: the global phase 604 and the iterative phase 606. In the global phase 604, a quick initial solution is computed for the power switch configuration. In the iterative phase 606, power switches are deleted and added until no improvement can be found.

Figure 8:
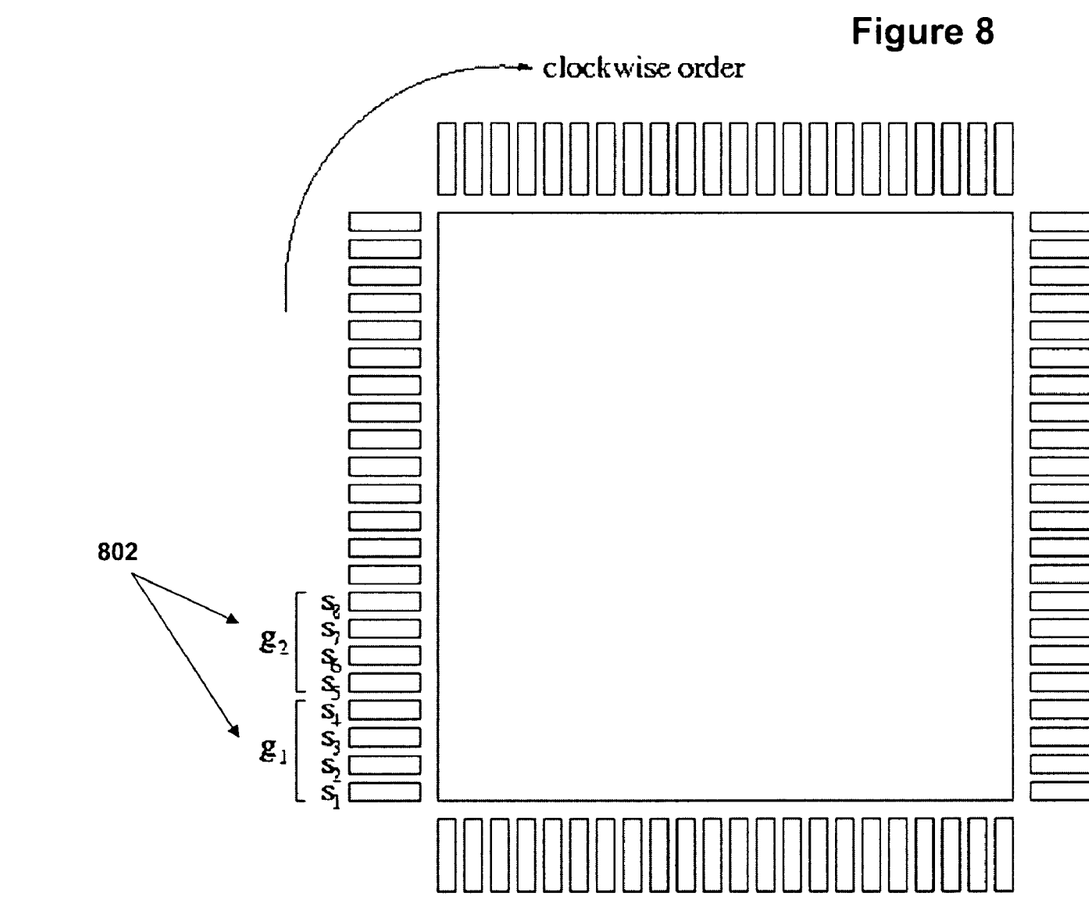
FIG. 8 illustrates ordering of power switches.

In the global phase 604, the static power analysis is initially run and the current across each power switch $I(s_i)$ is stored. The power switches $S_n$ are ordered in a clockwise manner as shown in FIG. 8. According to one embodiment, the process starts the order from lower left corner although other orders are also suitable.

The power switches S are then divided into groups 802 of k switches according to the order above into $G=\{g1, g2, \ldots, g[n/k]\}$. The total current of group $g_i$ is defined as the sum of all the currents of all power switches in the group:

$$I(g_i)=\Sigma_{s \in g_i} I(s).$$

The total number of switches needed for $g_i$ is computed by adding up the maximum current of each switch in the group until the sum exceeds $I(g_i)$, i.e.

$$\arg\min_p\{(\Sigma_{1 \leq q \leq p, s_q \in g_i} I_{max}(s_q))>I(g_i)\}.$$

The extra power switches are then removed until p switches remain in group $g_i$. The removal is done in such a way that the remaining switches are evenly distributed in the group. An example of this global phase is shown in FIG. 8.

The following pseudocode can be employed to implement this process:

determine $I_{max}$;
determine $I_{max\_total}$;
determine $I_{total\_for\_group}$;
if $(I_{max\_total}-I_{total\_for\_group})$ is greater than or equal to $I_{max}$
  then remove enough power switches such that
  $(I_{max\_total}-I_{total\_for\_group})$ is greater than 0 but less than $I_{max}$
else if $(I_{max\_total}-I_{total\_for\_group})$ is less than zero
  then add enough power switches such that
  $(I_{max\_total}-I_{total\_for\_group})$ is greater than 0 but less than $I_{max}$
else
  done since $(I_{max\_total}-I_{total\_for\_group})$ must be greater than 0 but less than $I_{max}$;

$I_{max\_total}$ refers to the sum of the $I_{max}$ values for all switches within the group.

As an illustrative example, consider a group of four switches, with the circuit locations associated with the switches having a current value $I_{total\_for\_group}=4$. Assume that $I_{max}=1.25$. Since there are four switches, $I_{max\_total}=(1.25*4)=5$. In this example, $(I_{max\_total}-I_{total\_for\_group})$ is therefore $(5-4)=1$, which is greater than zero but less than the value of $I_{max}$. As a result, there is an adequate number of power switches in this group to handle the power needs for the group location.

Consider another illustrative example that was overly conservative for an initial candidate power switch configuration, in which there was an excessive number of power switches that had been placed into the design. In this example, there is a total of five switches, with the circuit locations associated with the switches having a current value $I_{total\_for\_group}=4$. Assume that $I_{max}=1.25$. Since there are five switches, $I_{max\_total}=(1.25*5)=6.25$. In this example, $(I_{max\_total}-I_{total\_for\_group})$ is therefore $(6.25-4)=2.25$, which is greater than zero and also greater than the value of $I_{max}$. As a result, power switches will be removed until the value of $(I_{max\_total}-I_{total\_for\_group})$ is greater than 0 but less than $I_{max}$. In this example, this means that one power switch will be removed.

Consider yet another illustrative example that was overly optimistic for an initial candidate power switch configuration, in which not enough power switches had been placed into the original candidate design. In this example, there is a total of three switches, with the circuit locations associated with the switches having a current value $I_{total\_for\_group}=4$. Assume that $I_{max}=1.25$. Since there are three switches, $I_{max\_total}=(1.25*3)=3.75$. In this example, $(I_{max\_total}-I_{total\_for\_group})$ is therefore $(3.75-4)=$negative 0.25, which is less than zero. As a result, power switches will be added until the value of $(I_{max\_total}-I_{total\_for\_group})$ is greater than 0 but less than $I_{max}$. If there is insufficient space in a ring of a ring configuration to add another switch, then an additional ring may be added to the design to include the additional switch(es).

According to some embodiments, it is not assumed that $I_{max}(s_i)$ is the same for all power switches. To reduce the inaccuracy of approximating the number of switches needed for each group, the approach gradually removes switches by changing the size of the group each time. In one embodiment, the group size or k varies from 4, 8, 16, to [|S|/32].

After the global phase, the process enters an iterative phase. In this phase, a power switch can either be deleted or added. Assume that the current slack of power switch $s_i$ is stated as $I_s(s_i)=I_{max}(s_i)-I(s_i)$. In the deletion process, switches are sorted in non-increasing current slack. Switches are deleted one by one until no more switches can be deleted without violating $I_{max}(s_i)$. After a switch is deleted, its current will be distributed to remaining switches. If the number of remaining switches is n', the amount of extra current to be added to each remaining switch is estimated to be $I(s_i)/n'$. It is sufficient in some embodiments to only check the switch with the worst current slack.

The reverse is true in the addition process. Switches are sorted in the non-decreasing current slack. An added switch pulls in current from the existing switches. If the number of existing switches is n', the amount of current to be subtracted from each existing switch is estimated to be $I_{max}(s_i)/(n'+1)$. In some embodiments, it is sufficient to only check the switch with the worst current slack. Switches are added until the worst current slack becomes positive.

Power switches are deleted so that the design reaches a local minimum solution. They are added in order to allow hill climbing out of local minima. The approach alternates between adding and deleting power switches according to a schedule. Initially more power switches are added to allow for bigger jumps to different solutions. Fewer switches are added toward the end of the algorithm in order to reach a local minimum.

During the iterative process, power switches can be simply marked as deleted or added in the design database. The final results are committed to the database just before the process terminates.

Static power analysis is executed after the global phase and after each addition and deletion process. If after the iterative process, the results do not meet the saturation current constraint or the IR-drop constraints, the process iteratively runs the addition process until the constraints are met.

The invention can be used in a stand-alone configuration, in which each invocation of the static power analysis causes the building of a power graph from the design database, and then a build of the conductance matrix equation, before solving the linear equation (s). Under certain circumstances, building such power graphs could take an excessive amount of time, particularly for a large design. In some cases, the power graph is identical for each invocation of the static power analysis except for the power switches that are added or deleted.

To speed up the processing time, the static power analysis tool can be enhanced to take into account which switches are added or deleted. With this information, it builds the power graph only when it is invoked for the first time, and will not do so in subsequent invocations.

Therefore, what has been disclosed is a novel approach for implementing, analyzing, and optimizing a power switch configuration. This approach provides significant improvements over ad-hoc approaches that attempt to manually set the number of power switches. The invention provides numerous advantages, including the advantages of fast processing time. In addition, the approach separates optimization from implementation. Moreover, separating optimization from implementation allows the invention to be applied at various stages of the design flow, for example, floorplanning and post-route. Separating optimization from implementation also allows the process to be agnostic about design rules. In addition, separating optimization from implementation allows the invention to be used in both column and ring based power switch insertion methodologies. The invention uses fast and simple internal approximation when computing current distribution. The invention also tightly integrates the optimization step and the IR-drop analysis step to reduce run time.

System Architecture Overview

Figure 9:
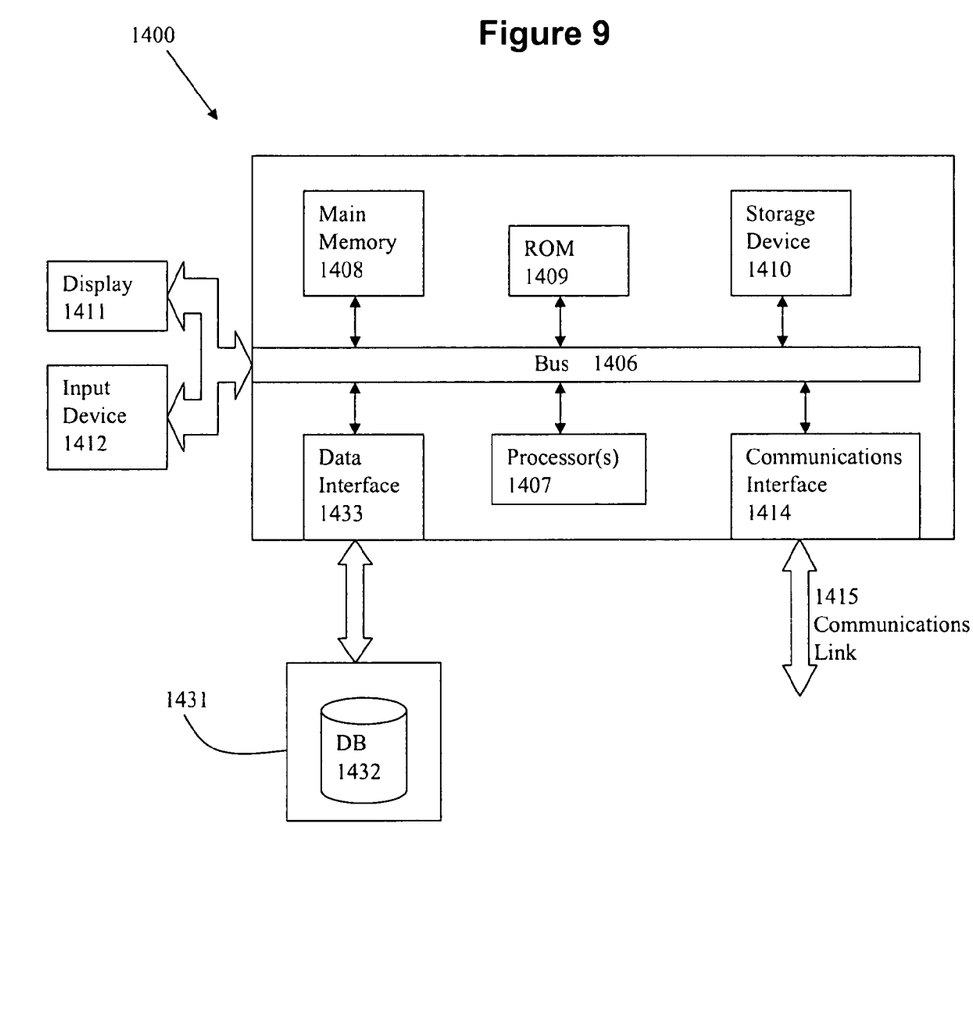
FIG. 9 is a block diagram of an illustrative computing system 1400 suitable for implementing an embodiment of the present invention.

FIG. 9 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer implemented method, comprising:
generating a candidate power switch configuration for an electronic design, wherein the electronic design comprises data for a physical design of an electronic circuit;
analyzing power consumption for the candidate power switch configuration;
computing circuit values with respect to the candidate power switch configuration;
using at least one processor to generate an improved power switch configuration for the electronic design by at least performing a constraint mapping that maps multiple current constraints, which are associated with a power switch, a saturation current of the power switch, a maximum current derived from an electrical characteristic of the power switch, and a block of circuitry controlled by the power switch in the electronic design, into a single current constraint by determining a minimum current of multiple currents, which are determined for the electronic circuit based at least in part upon the multiple current constraints, for the power switch; and
displaying the electronic design with the improved power switch configuration on a display device or storing the electronic design with the improved power switch configuration on a non-transitory computer readable medium.

2. The method of claim 1 in which the improved power switch configuration is implemented by a process, further comprising:
performing global analysis; and
performing iterative analysis.

3. The method of claim 2 in which constraint mapping is performed where saturation current and IR drop are converted to current constraints.

4. The method of claim 3 in which a single maximum constraint is implemented.

5. The method of claim 2 in which the global analysis is performed to implement static power analysis or dynamic power analysis across power switches.

6. The method of claim 5 in which the power switches are approximately evenly divided into groups.

7. The method of claim 2 in which the iterative analysis adds or deletes power switches.

8. The method of claim 7 in which power switches are deleted or added until none of the switches can be deleted or added without violating a current constraint.

9. The method of claim 2 in which static power analysis or dynamic power analysis is performed after the global analysis or after an addition or deletion of a power switch.

10. The method of claim 1 in which the improved power switch configuration is implemented for a prototype of the electronic design.

11. The method of claim 1 in which power switches are implemented in a ring-based configuration or a column-based configuration.

12. The method of claim 1 in which the act of optimizing the improved power switch configuration is separated from implementation of candidate power switch configuration.

13. A computer program product comprising a non-transitory computer readable medium that includes program code which, when executed by at least one processor, causes the at least one processor to execute a process, the process comprising:
generating a candidate power switch configuration for an electronic design, wherein the electronic design comprises data for a physical design of an electronic circuit;
analyzing power consumption for the candidate power switch configuration;
computing circuit values with respect to the candidate power switch configuration; and
using the at least one processor to generate an improved power switch configuration for the electronic design by at least performing constraint mapping that maps multiple current constraints, which are associated with a power switch, a saturation current of the power switch, a maximum current derived from an electrical characteristic of the power switch, and a block of circuitry controlled by the power switch in the electronic design, into a single current constraint by determining a minimum current of multiple currents, which are determined for the electronic circuit based at least in part upon the multiple current constraints, for the power switch; and
displaying the electronic design with the improved power switch configuration on a display device for storing the electronic design with the improved power switch configuration on a non-transitory computer readable medium.

14. The computer program product of claim 13 in which the improved power switch configuration is implemented by a process, further comprising:
performing global analysis; and
performing iterative analysis.

15. The computer program product of claim 14 in which constraint mapping is performed where saturation current and IR drop are converted to current constraints.

16. The computer program product of claim 15 in which a single maximum constraint is implemented.

17. The computer program product of claim 14 in which the global analysis is performed to implement static power analysis or dynamic power analysis across power switches.

18. The computer program product of claim 17 in which the power switches are approximately evenly divided into groups.

19. The computer program product of claim 14 in which the iterative analysis adds or deletes power switches.

20. The computer program product of claim 19 in which power switches are deleted or added until none of the switches can be deleted or added without violating a current constraint.

21. The computer program product of claim 14 in which static power analysis or dynamic power analysis is performed after the global analysis or after an addition or deletion of a power switch.

22. The computer program product of claim 13 in which the improved power switch configuration is implemented for a prototype of the electronic design.

23. The computer program product of claim 13 in which power switches are implemented in a ring-based configuration or a column-based configuration.

24. The computer program product of claim 13 in which the act of optimizing the improved power switch configuration is separated from implementation of candidate power switch configuration.

25. A system, comprising:
a non-transitory computer readable medium that is to store at least a part of program code;

at least one processor that is to execute the program code to:
  generate a candidate power switch configuration for the electronic design, wherein the electronic design comprises data for a physical design of an electronic circuit;
  analyze power consumption for the candidate power switch configuration;
  compute circuit values with respect to the candidate power switch configuration; and
  generate an improved power switch configuration for the electronic design by at least performing a constraint mapping that maps multiple current constraints, which are associated with a power switch, a saturation current of the power switch, a maximum current derived from an electrical characteristic of the power switch, and a block of circuitry controlled by the power switch in the electronic design, into a single current constraint by determining a minimum current of multiple currents, which are determined for the electronic circuit based at least in part upon the multiple current constraints, for the power switch.

26. The system of claim 25 in which the improved power switch configuration is implemented by performing global analysis and iterative analysis.

27. The system of claim 26 in which constraint mapping is performed where saturation current and IR drop are converted to current constraints.

28. The system of claim 27 in which a single maximum constraint is implemented.

29. The system of claim 26 in which the global analysis is performed to implement static power analysis or dynamic power analysis across power switches.

30. The system of claim 29 in which the power switches are approximately evenly divided into groups.

31. The system of claim 26 in which the iterative analysis adds or deletes power switches.

32. The system of claim 31 in which power switches are deleted or added until none of the switches can be deleted or added without violating a current constraint.

33. The system of claim 26 in which static power analysis or dynamic power analysis is performed after the global analysis or after an addition or deletion of a power switch.

34. The system of claim 25 in which the improved power switch configuration is implemented for a prototype of the electronic design.

35. The system of claim 25 in which power switches are implemented in a ring-based configuration or a column-based configuration.

36. The system of claim 25 in which optimizing the improved power switch configuration is separated from implementation of candidate power switch configuration.

* * * * *